June 22, 1965  W. J. GREENE  3,191,111
PULSE RATE RESPONSIVE MOTOR CONTROL FOR A MACHINE TOOL
Filed July 13, 1962  4 Sheets-Sheet 1

INVENTOR.
WILLIAM J. GREENE
BY
Milford F. Leitze
AGENT

FIG. 3

| DIRECTION OF TRAVEL | COUNTER-CLOCKWISE | CLOCKWISE |
|---|---|---|
| FIRST QUADRANT | INPUT | OUTPUT |
| $\pm \alpha$ | − | + |
| $\pm \psi$ | + | − |
| $\pm \Delta \sin \theta$ | + | − |
| $\pm x$ | − | + |
| $\pm y$ | + | − |
| SECOND QUADRANT | | |
| $\pm \alpha$ | − | + |
| $\pm \psi$ | + | − |
| $\pm \Delta \sin \theta$ | − | + |
| $\pm x$ | − | + |
| $\pm y$ | − | + |
| THIRD QUADRANT | | |
| $\pm \alpha$ | − | + |
| $\pm \psi$ | + | − |
| $\pm \Delta \sin \theta$ | + | − |
| $\pm x$ | + | − |
| $\pm y$ | − | + |
| FOURTH QUADRANT | | |
| $\pm \alpha$ | − | + |
| $\pm \psi$ | + | − |
| $\pm \Delta \sin \theta$ | − | + |
| $\pm x$ | + | − |
| $\pm y$ | + | − |

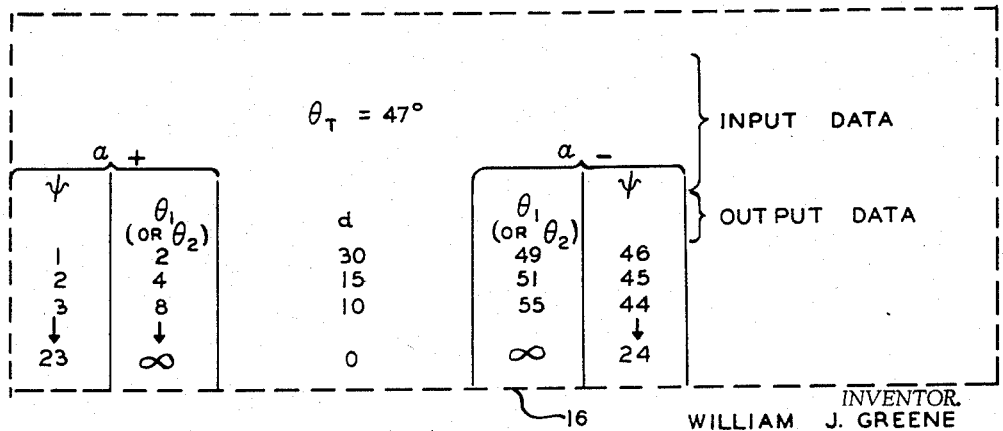

FIG. 5

June 22, 1965 W. J. GREENE 3,191,111
PULSE RATE RESPONSIVE MOTOR CONTROL FOR A MACHINE TOOL
Filed July 13, 1962 4 Sheets-Sheet 3

INVENTOR.
WILLIAM J. GREENE
BY
AGENT

United States Patent Office 3,191,111
Patented June 22, 1965

3,191,111
PULSE RATE RESPONSIVE MOTOR CONTROL
FOR A MACHINE TOOL
William J. Greene, Bound Brook, N.J., assignor to Air
Reduction Company, Incorporated, New York, N.Y.,
a corporation of New York
Filed July 13, 1962, Ser. No. 209,644
6 Claims. (Cl. 318—162)

This invention relates to methods and apparatus for controlling the path of relative movement of movable members by means of numerical data supplied from records, e.g., punch cards, record tapes or the like. It is described herein as applied to the control of the movement of an oxygen cutting head relative to a workpiece, but is applicable to other machine tools, curve generators and the like.

It is common to control the movement of a tool across a workpiece by providing two motors, each of which produces relative movement of the tool and workpiece with respect to one of a pair of coordinates. It has been further proposed to control such a motor by supplying to it a series of energizing electrical pulses, such that each pulse produces one increment of movement of the motor and hence one increment of relative movement of the tool and workpiece. The frequency of the pulses is selected to be high, and the size of the increment of movement in response to each pulse is selected to be small enough so that each increment may be treated as an infinitesimal without substantial error. In other words, the pulse frequency and the size of the increments of movement can be selected to maintain the error within any selected limits of accuracy. Such control systems are commonly known in the art as numerical control systems.

In such pulse rate controlled machine tools, the velocity of movement parallel to one coordinate is determined by the average pulse rate over a substantial interval of time. Minor variations in the pulse rate within that interval do not introduce appreciable errors in the path of the tool across the workpiece. The average pulse rates supplied to the two motors are varied to produce different contours of the path of movement of the tool with respect to the workpiece. The pulse rates are controlled by means of recorded data so as to make the tool trace an arc of a circle or a straight line.

In the apparatus of the prior art, when it is desired to make the tool trace an irregular path with respect to the workpiece, it has been necessary to break down the path into short segments and to transmit to the apparatus separate sets of data, each defining one of the short segments, either a straight line, an arc of a circle, or (in some machines) a segment of a parabola. This tracing or generation of irregular patterns is particularly difficult where variable radius curves are involved. The variable radius curves commonly required to be generated are not typically parabolic or circular segments. In order to approximate such a curve with a succession of parabolic or circular segments, it is usually necessary to break the curve down into a large number of relatively short segments, each having its own set of identifying data. Thus, a large quantity of data is required in order to make the tool trace a typical variable radius path.

Another type of prior art apparatus traces a variable radius curve by utilizing the coordinates of a series of spaced points in the coordinate system to define the general outline of the path to be followed by the tool with respect to the workpiece and interpolating between these spaced points to determine the contour path. Such an interpolating apparatus is very complex, and tends to produce irregularities in the path. While the irregularities can be reduced by increasing the number of interpolations between points, such an increase in number of interpolations means a corresponding increase in the complexity of the apparatus.

The problem of drawing variable radius curves was encountered long ago and was practically solved by the use of the common drafting instrument known as a French curve. The French curve has an outline presenting several profiles of varying radius. Each curve on such an instrument follows a segment of a geometrical figure known as a Sici spiral. The Sici spiral may be defined mathematically with respect to a set of rectangular coordinates X and Y by the following two equations:

$$y = \int_U^\infty \frac{\sin Z}{Z} dZ = \psi\mu$$

[$\psi\mu$ is sometimes written psi$\mu$ or Si$\mu$]

$$x = \int_U^\infty \frac{\cos Z}{Z} dZ = \chi\mu$$

[$\chi\mu$ is sometimes written Chi$\mu$ or Ci$\mu$]

The name Sici comes from a combination of the two functional names Si and Ci, as used in the two equations above.

It is an object of the present invention to provide an improved numerical control for machine tools.

Another object is to provide a means for programming variable radius curves from starting and ending positions and slopes.

Another object is to provide an improved numerical control for generating a variable radius curve.

Another object is to provide apparatus for generating a Sici spiral.

The foregoing and other objects of the invention are attained in the apparatus described herein, which is an improvement on a prior art apparatus. The prior art apparatus includes a pulse generator which produces output pulses at a predetermined rate. The output from the pulse generator is fed to a pulse rate multiplier having an accumulator into which is set a fixed numeral, dependent upon the desired velocity of the tool along the path to be traced. The output of the pulse rate multiplier is a train of pulses occurring at a rate equal to the product of the input rate times the accumulator setting. The numeral set into the accumulator is thus the multiplicand of the input rate. The output of the multiplier just mentioned is supplied to two primary multipliers, one for each of the two coordinate drive motors. Each of these primary multipliers has an associated accumulator. The output of the primary multipliers is fed through suitable amplifiers to the X and Y coordinate drive motors. Associated with each motor is a distance accumulator. The distance accumulators are initially set for the total distance to be traveled in the X and Y directions. For tracing a straight line, the accumulators of the primary pulse rate multipliers are set respectively for the sine and cosine of the angle between one of the coordinates and the direction of the line to be traced. The sine and cosine accumulators retain those settings throughout the travel of the motor along that line. The distance accumulators are driven backwards toward zero by the outputs of the primary pulse rate multipliers. When both distance accumulators reach zero, the tracing of the defined line segment has been accomplished, and the motors stop. For tracing an arc of a circle, the output of each pulse rate multiplier is cross-connected to drive the accumulator of the opposite primary multiplier, thereby continuously changing the pulse rates supplied to both motors, and causing the tool to follow a circular arc.

In apparatus constructed in accordance with the present invention, there are no cross-connections between the outputs of the two primary pulse rate multipliers and the respective opposite accumulators. In the place of those cross-connections, there are provided a pair of secondary pulse rate multipliers, one for driving the accumulator of each of the primary pulse rate multipliers. Each accumulator of a primary pulse rate multiplier also sets the multiplicand of the other secondary multiplier. As explained below, this combination of four multipliers and two accumulators constitutes a sine-cosine pulse rate generator.

The two secondary pulse rate multipliers have inputs connected to the output of an angular velocity pulse rate multiplier, whose input is connected to the main pulse generator. The angular velocity pulse rate multiplier has an accumulator which determines its multiplicand. That accumulator includes an initial setting means, means for varying the setting, and means for selecting the sense of the setting variation. The setting varying means is driven by an acceleration exponential factor pulse rate multiplier whose input is connected to the output of the angular velocity pulse rate multiplier, and similarly has an accumulator which determines its multiplicand.

To trace a straight line, the accumulator of the angular velocity pulse rate multiplier is initially set equal to zero, and the accumulator of the acceleration exponential factor pulse rate multiplier is also set equal to zero. To trace the arc of a circle, the accumulator of the acceleration exponential factor multiplier is set to zero, and the accumulator of the angular velocity pulse rate multiplier is set to some value other than zero. To trace a variable radius curve, the accumulator of both the angular velocity and the angular acceleration multipliers are set to some value other than zero.

To trace a complex outline including straight line segments, arcuate segments and variable radius segments, the outline must be divided into segments separated into those three classes. Furthermore, each of the variable radius segments must have its radius varying continuously in the same sense throughout its length, and it must have no point of inflection. Both the arcuate and the variable radius segments must be single valued as to both coordinates throughout their length.

After the various segments have been selected, each segment is measured to determine a set of segment-defining data. For each segment, measurements are made of: (1) the length of the straight line between the ends of the segment; (2) the angular directions of that line and of the tangent lines at the ends of the segment relative to the coordinates. From these measurements are computed, for example, by a computing apparatus, the settings for the various accumulators in the numerical control apparatus described above. Each segment of the line to be traced is thus defined by a different set of data to be fed into the accumulators. The successive sets of data defining the line to be traced are recorded on a suitable medium, such as tape or cards. The sets of data are transferred from the record to storage units associated with the respective accumulators. As soon as the tracing of one segment is completed, a sequence control apparatus operates to transfer the next set of data from the storage units into the accumulators and the motors are started to trace the next segment.

Other objects and advantages of the invention will become apparent from a consideration of the following specification and claims, taken together with the accompanying drawings.

In the drawings:

FIG. 3 is a table showing the settings of certain selective control inputs for curves located in the four conventional quadrants and for curves of increasing and decreasing radius;

FIG. 5 is a table illustrating the operation of a memory device shown diagrammatically in FIG. 4.

FIG. 1

This figure illustrates a geometrical curve 1 known as a Sici spiral. As such a curve approaches the origin of the X and Y axes, it closely approximates a circle. At the outer end of the spiral, it becomes asymptotic to a straight line, which may have any direction in the XY plane.

Figure 2:
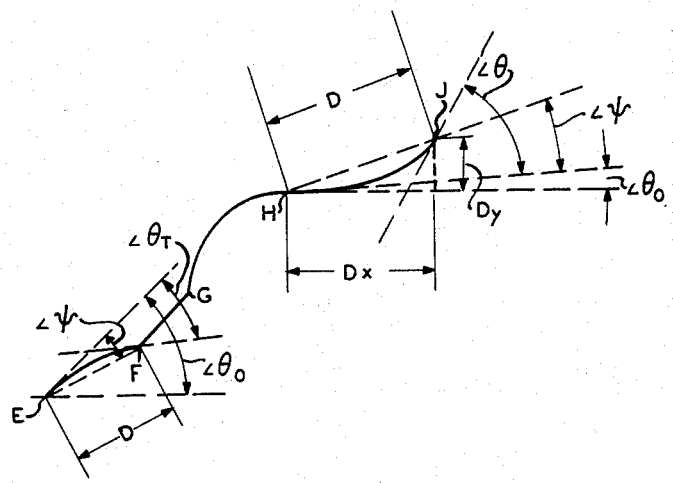
FIG. 2 is a graphical plan view of an irregular outline which may be generated by the apparatus of the present invention.

FIG. 2 shows an irregular outline EFGHJ, which it is desired to trace or to reproduce in the movements of a cutting torch, a machine tool or the like, and which is typically supplied as a mechanical drawing. The line EFGHJ has a first segment EF of variable radius, a straight line segment FG, an arcuate segment GH and another variable radius segment HJ. In order to trace such a line with the apparatus described herein, it must be considered as a sequence of segments which are classified as either straight, arcuate, or variable radius segments. The arcuate and variable radius segments must be single-valued as to both coordinates. Each variable radius segment must have its radius varying continuously in the same sense throughout its length, and must have no point of inflection. Any such point of inflection, or point where the sense of variation of the radius changes, must be regarded as common to two segments, each of which must be defined by a separate set of data.

It is a particular advantage of the present invention, as compared to variable radius curve generators of the prior art, that there are no limitations on the lengths of the variable radius curve segments which may be traced, other than those limitations just enumerated. A given curve can be traced in a substantially smaller number of segments, and hence a smaller number of sets of data, than is the case with prior art methods and apparatus.

For each variable radius segment, four measurements must be made, to be included in a set of data to be supplied to the apparatus described below. It is assumed that it is desired to trace the line EFGHJ in the direction from E to J.

Referring to the segment EF in FIG. 2, the four measurements to be made are: (1) the straight line distance D between the points E and F; (2) the angle $\theta_0$ between the X axis and the tangent to the segment at the point E; (3) the angle $\theta_T$ between the tangent at the point E and the tangent at the point F, sometimes referred to hereinafter as the "angle turned through"; and (4) the angle $\psi$ between the straight line EF and the tangent to the curve at the point E.

In addition to the four measurements made from the segment to be traced, a fifth quantity must be determined, usually from empirical data. This quantity is identified herein as V and determines the rate of travel of the tracing element over the working surface. For example, it may represent the rate of travel of a tool over a workpiece. The particular rate selected depends upon the nature of the tool and of the workpiece. If the machine is simply moving a stylus across a piece of paper, then obviously a higher speed is permissible than when an oxygen cutting tool is traveling across a relatively thick slab.

A set of data defining a particular line segment must contain five numerical inputs and six selective control inputs. The five numerical inputs are the four measurements D, $\theta_0$, $\theta_T$, and $\psi$, and the empirical quantity V, all identified above. The six selective control inputs are:

(1) An R input which has three distinguishable values, and identifies the segment to be traced as either a straight line, an arc, or a variable radius curve;

(2) $A\pm\psi$ input which tells whether $\psi$ is to be added or subtracted from $\theta_0$ to get the angle between the X axis and the straight line joining the ends of the segment. (For segment EF, $\psi$ is subtracted from $\theta_0$, while for segment HJ, $\psi$ is added to $\theta_0$);

(3) $A\pm\alpha$ input, which depends on whether the radius of curvature is increasing or decreasing.

(4) $A\pm\sin\theta$ input, which depends on whether $\sin\theta$ increases or decreases in the segment;

(5) and (6) $\pm X$ and $\pm Y$ inputs, which determine the direction of the X and Y motors throughout the segment.

The table in FIG. 3 shows the settings of all the several selective control inputs (except R) for all four quadrants and for both directions of travel about the center of curvature.

It may be observed that the selection of a particular quadrant determines the settings of the selective control inputs for $\pm\Delta\sin\theta$, $\pm X$, $\pm Y$. It may be further observed that for a decreasing radius of curvature, $\alpha$ is $+$ and $\psi$ is $-$, while for an increasing radius of curvature, $\alpha$ is $-$ and $\psi$ is $+$. The selection of $\pm\alpha$ and $\pm\psi$ is independent of the quadrant selection.

All these inputs together are inserted on a suitable record such as a punch card, punch tape, or magnetic tape. Such a set of data completely determines a particular segment to be traced by the apparatus. All the numerical inputs are required for each segment, except in the case of straight line segments, where $\psi$ and $\theta$ are equal to zero. Selective control inputs R, $\pm X$, $\pm Y$, and $\pm\sin\theta$ are also required for all segments. $\pm\psi$ is required for all curved segments but not of straight line segments. $\pm\alpha$ is required for variable radius segments only.

FIG. 4

Figure 6:
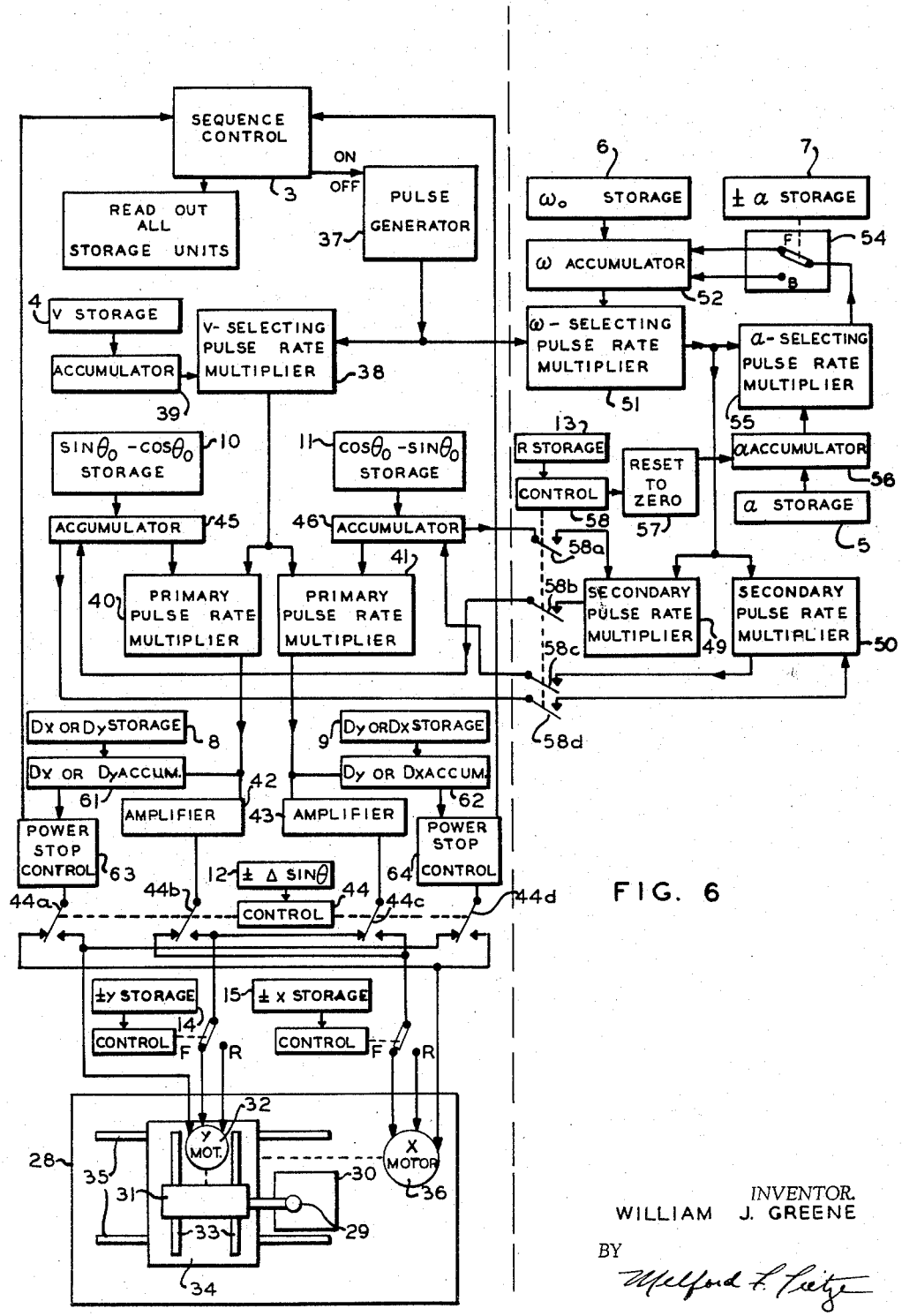
FIG. 6 is a diagrammatic illustration of an outline generating mechanism constructed in accordance with the present invention.

This figure illustrates diagrammatically computing apparatus for taking the original data obtained by measurement and observation from the outline EFGHJ in FIG. 2 and transforming it into corresponding data suitable for transfer to the tracer control apparatus of FIG. 6. The measurements and observed data from FIG. 2 are presented to the apparatus of FIG. 4 on punched cards or punched tape, or the like. Each set of data representing one segment of the outline to be traced is read by a reader generally indicated at 2 in FIG. 4. One such set of data is indicated diagrammatically in FIG. 4 by a plurality of "INPUT" legends, that set of data consisting of recorded values for each of the quantities D, V, $\theta_T$, $\theta_0$ and $\psi$ and recorded instructions for each of the selective control inputs, R, $\pm\psi$, $\pm\alpha$, $\pm\sin\theta$, $\pm X$ and $\pm Y$. The data from the reader 2 is transferred through the various elements of the computer in a coordinated sequence by a sequence control generally indicated at 3. The translated data is stored in twelve storage units 4, 5, 6, 7, 8, 9, 10, 11, 12, 13, 14 and 15 appearing along the right-hand side of FIG. 3.

Figure 4:
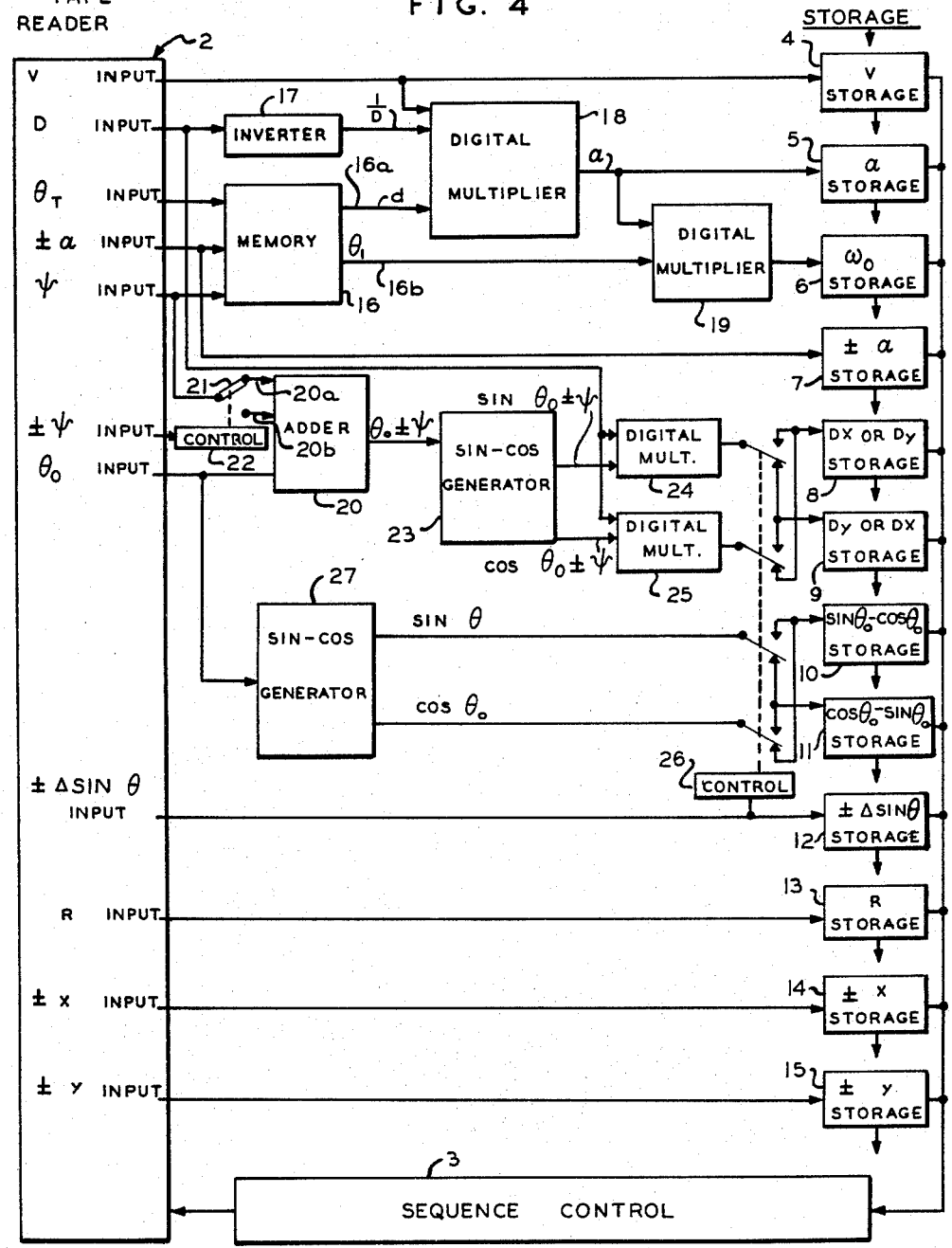
FIG. 4 is a diagrammatic illustration of computer apparatus which is used to translate the data taken from the outline to be generated into the inputs required for the outline generating mechanism of FIG. 6.

The apparatus illustrated in FIG. 4 is one embodiment of apparatus for transforming the measurements and observations from FIG. 2 into a form suitable for use by the apparatus of FIG. 5. Those transformations may alternatively be accomplished manually or by computation where necessary. The quantitative data in the reader 2, in storage units 4 to 6 and 8 to 11, and throughout the apparatus of FIG. 4 may be considered to be in the decimal form. That data alternatively may be in the binary form. The particular form in which the data is recorded is not material.

The $\theta_T$, $\psi$, and $\pm\alpha$ inputs are fed into a memory device 16, part of which is illustrated in tabular form in FIG. 5. There is there seen a fragmentary table headed by the notation "$\theta_T=47°$". Similar, but complete tables should be prepared for each value of $\theta_T$ between 0° and 90°. The left-hand side of the table is marked "$\alpha+$" and the right-hand side of the table is marked "$\alpha-$." Each side of the table has columns headed "$\psi$ and $\theta_1$." In the center of the table is a column headed "$d$." Thus it may be seen that a value of $\theta_T$, a $+$ or $-\alpha$ selection, and a value of $\psi$ determines in the table for that angle $\theta_T$, a line from which may be read a value of $d$ (straight line distance between the ends of a segment of a Sici spiral) and a value identified as $\theta_1$, from a column selected in accordance with the plus or minus selection. The derivation of $d$ and $\theta_1$, and the physical significance of those terms, will be explained below.

It will be readily understood by those skilled in the art that the table illustrated in FIG. 5 is the equivalent of a memory device such as that shown diagrammatically at 16 in FIG. 4, and having the data for the output quantities $d$, and $\theta_1$ and stored at locations identified by addresses consisting of values for $\theta_T$, $\psi$ and $\pm\alpha$ selection. The memory device 16 has an output 16a (see FIG. 4) at which the output quantity $d$ is delivered and an output 16b at which the output quantity $\theta_1$, is delivered.

The quantity D from the reader 2 is fed to an inverter 17 to produce an output $1/D$, which is fed to a digital multiplier 18. The V input signal is also fed to another input of the digital multiplier 18. The output 16a of memory device 16 is connected to a third input of the digital multiplier 18. That multiplier determines the product of its three inputs and produces at its single output a value identified as "$\alpha$," according to the equation:

$$\alpha = V\frac{d}{D} \quad (1)$$

The $\alpha$ output of the digital multiplier is fed directly to an $\alpha$ storage device 5 and is also fed to another digital multiplier 19 having a second input which receives $\theta_1$ from output 16b of the memory device 16. Digital multiplier 19 determines the product ($\alpha\theta_1$) of its two inputs, hereinafter identified as $\omega_0$, and delivers it to an $\omega_0$ storage unit 6.

The V input is also delivered to V storage unit 4.

The $\theta_0$ input is delivered to an adder 20 having two further inputs 20a and 20b, one of which is selected by a selector switch 21 operated by a control unit 22 responsive to the $\pm\psi$ input. The $\psi$ input is fed to the switch 21 and is directed thereby to one or the other inputs 20a or 20b of the adder 20, depending on whether $\psi$ is to be added to or subtracted from $\theta_0$. The adder 20 produces an output which measures $\theta_0\pm\psi$, and delivers it to a sine-cosine generator 23, having a sine output connected to one input of a digital multiplier 24 and a cosine output connected to one input of a digital multiplier 25. The digital multipliers 24 and 25 each have a second input. Both of those second inputs are connected to the D input. Each of these multipliers determines the product of its two inputs and delivers that product to one of the two storage units 8 and 9, depending upon the positions of switches operated by a control unit 26, responsive to the $\pm\sin\theta$ input.

The $\theta_0$ input is also delivered to a sine-cosine generator 27 having a sine output and a cosine output delivered to two storage units 10 and 11. Again, the distribution of the sine and cosine outputs between the units 10 and 11 depends upon the control unit 26.

The sequence control 3 operates in a manner well known in the art to assure that all the computations are performed in the proper sequence. After all the storage units 4 to 15 are filled with a set of data ready for transfer to the apparatus of FIG. 6, the sequence control then causes the reader to advance the tapes or cards to introduce a new set of data for the next segment to be traced. The reader will not start reading the new set of data, however, until the set of data in the storage units has been transferred to the outline generating apparatus of FIG. 6, and the storage units are thereby cleared to receive the new set of data.

FIG. 5

This figure is a table showing the variation in the relationship of certain angles and distances in a unit Sici spiral. As mentioned above, a Sici spiral may be defined as the curve connecting the family of points whose ordinate $$y = SiU = \int_U^\infty \frac{\sin Z}{Z} dZ \qquad (1a)$$

and whose abscissa $$x = CiU = \int_U^\infty \cos Z \qquad (1b)$$

It is a characteristic property of a Sici spiral that the parameter U is equal to the angle formed by the tangent to the Sici spiral at the point U with the horizontal axis. Expressed in another form $$U = \tan^{-1}\frac{dy}{dx} \qquad (1c)$$

Figure 1:
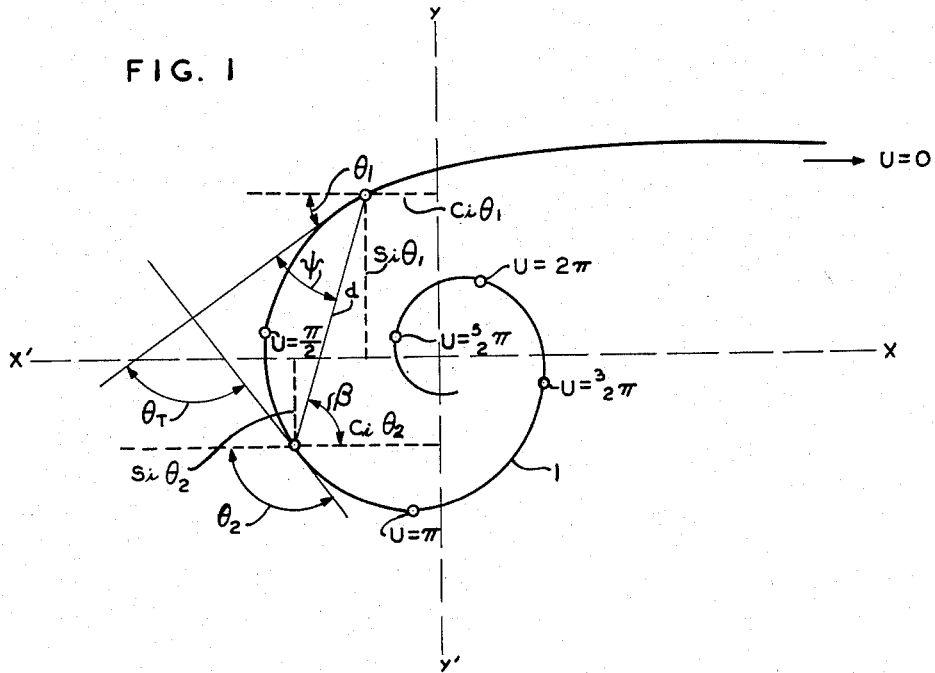
FIG. 1 is a graphical illustration of a Sici spiral.

The table of FIG. 5 is prepared for a particular value of $\theta_T$ (the angle turned through—see FIG. 1). In the table illustrated, $\theta_T = 47°$. Similar tables are required for each value of $\theta_T$ in the range of interest (usually 0° to 90°).

The table shows the values for $\theta_1$, $\theta_2$, $\psi$ and $d$. The meanings of these characters are illustrated graphically in FIG. 1. $\theta_1$ is the value of U at the starting point of a particular segment of the Sici spiral. $\theta_2$ is the value of U at the ending point of the same portion. (When traversing the spiral in the opposite direction, the identities of $\theta_1$ and $\theta_2$ are reversed.) $\psi$ is the angle betwen the tangent to the spiral at $\theta_1$ and the straight line connecting the points $\theta_1$ and $\theta_2$. The values of $d$ in the table are dimensionless and represent a ratio.

In preparing the table, each value of $\theta_T$ is selected arbitrarily, as indicated above. The values of $\theta_1$ are selected over a range from 0 to infinity. $\theta_2$ is then determined by the relationship (from the geometry of the figure):

$$\theta_T = \theta_2 - \theta_1 \qquad (1d)$$

Having determined the value for $\theta_1$ and $\theta_2$, the values for $d$ can be determined by applying theorem of Pythagoras as illustrated in FIG. 1, arriving at the following equation:

$$d = \sqrt{(Si\theta_1 - Si\theta_2)^2 + (Ci\theta_1 - Ci\theta_2)^2} \qquad (1e)$$

Referring again to FIG. 1, it may be seen that $$\angle B = \angle \psi + \angle \theta_1 \qquad (1f)$$

or $$\psi = B - \theta_1 \qquad (1g)$$

$$= \tan^{-1}\left(\frac{Si\theta_1 - Si\theta_2}{Ci\theta_1 - Ci\theta_2}\right) - \theta_1 \qquad (1h)$$

The values of Si and Ci functions for the selected values of $\theta_1$ and $\theta_2$ may be taken from published tables of those functions. See, for example, the Tables of Functions by E. Jahnke and F. Emde, Dover Publications, New York, 1945, pages 3 to 9.

The $d$ values in the table from $\psi = 0$ to $$\psi = \frac{\theta_T}{2}$$

are repeated in the reverse order over the interval from $$\frac{\theta_T}{2} \text{ to } \theta_T$$

Consequently, the table can be shortened, as shown, by using one $d$ column for two sets of $\psi$ and $\theta_0$ columns.

When $\alpha$ is $+$, the $\psi$ and $\theta_1$ columns at the left-hand side of the table are used. When $\alpha$ is $-$, the $\psi$ and $\theta_1$ columns at the right-hand side of the tables are used.

FIG. 6

There is illustrated diagrammatically at 28 an oxygen cutting apparatus including an oxygen cutting torch 29 movable relative to a stationary workpiece, shown as a plate 30. A carriage 31, supporting the torch 29, is driven by a Y-motor 32 along a pair of guides 33 mounted on another plate 34 which is in turn driven along another pair of guides 35 by means of an X-motor 36. The guides 33 extend vertically as viewed in FIG. 6, whereas the guides 35 extend from left to right. The motors 32 and 36 are of the pulse responsive type. Each input pulse delivered to a motor serves to advance the load driven by the motor one increment of distance. The gearing of the motors and the increment through which each motor moves its load in response to each individual pulse are selected to be small enough so that they can be treated mathematically as infinitesimals without substantial error.

Operating pulses for the motors 32 and 36 are generated in an electrical pulse generator 37, which may operate at a fixed preselected rate. Typically, the motors are so constructed that a large number (e.g., 1700) of pulses are required to produce one revolution of a motor. Hence, minor variations in the pulse rate do not affect appreciably the rate at which the motor drives its load. The average pulse rate over several revolutions is the significant factor. The generator 37 delivers pulses to the input of a velocity selecting pulse rate multiplier 38 whose multiplicand is determined by an accumulator 39 which is set by the V storage unit 4. The pulse rate at the output of the multiplier 38 is hereinafter referred to as $v$.

The term "pulse rate multiplier" as used in this specification, means any device having an input adapted to receive a train of electrical pulses and an output at which it produces another train of electrical pulses having an average pulse rate equal to the product of the average pulse rate of the train of input pulses times a multiplicand determined by an accumulator operatively connected to the pulse rate multiplier. A suitable pulse rate multiplier for use in the apparatus of the present invention is shown and described in the copending application for United States Letters Patent of William J. Greene, and Neil J. Normando, Serial No. 230,919, filed October 16, 1962.

The output of the multiplier 38 is delivered to two primary pulse rate multipliers 40 and 41, whose outputs are delivered through amplifiers 42 and 43, respectively, to the motors 32 and 36.

A control unit 44, responsive to the $\pm\Delta \sin \theta$ storage unit 12, operates switches 44a, 44b, 44c, and 44d. In the positions shown, switches 44b and 44c are effective to send the outputs of multipliers 40 and 41, respectively, to the X-motor 36 and to the Y-motor 32. The control unit 44 may operate switches 44b and 44c to the right from the positions shown, so that the outputs of multipliers 40 and 41 are then sent respectively to the Y-motor 32 and X-motor 36.

The pulse rate multiplier 40 produces pulses at an output rate which is equal to the product of the input pulse rate $v$ times the setting of an accumulator 45. Similarly, the pulse rate multiplier 41 produces pulses at an output pulse rate equal to the product of the input pulse rate $v$ times a multiplicand determined by the setting of an accumulator 46.

The initial setting of the accumulator 45 is determined by the sin $\theta_0$ or cos $\theta_0$ storage unit 10. The setting of accumulator 45 is varied in response to pulses from a secondary pulse rate multiplier 49.

The initial setting of the accumulator 46 is determined by the cos $\theta_0$ or sin $\theta_0$ storage unit 11. The setting of accumulator 46 is varied in response to pulses from another secondary pulse rate multiplier 50.

Each of the accumulators 45 and 46 may consist of a shifting register, each stage of which controls a corresponding gate in its associated primary multiplier 40 and 41. The inputs from the storage units 10 and 11 are the side entry inputs to the shifting registers, while the inputs from the secondary multipliers are the end inputs.

The multiplicand of the multiplier 49 is the setting of accumulator 46. The multiplicand of multiplier 50 is the setting of accumulator 45. The pulse rate inputs of the secondary pulse rate multipliers 49 and 50 are supplied from the output of an angular velocity selecting or "$\omega$-selecting" pulse rate multiplier 51 whose input is connected to the pulse generator 37. The multiplicand of the multiplier 51 is controlled by an accumulator 52 whose initial setting is determined by the $\omega_0$ storage unit 6 and whose setting may be varied by an $\alpha$-selecting multiplier 55. The direction in which the output of multiplier 55 changes the setting of accumulator 52 is determined by a control 54 set by the $\pm\alpha$ storage unit 7. The pulse rate multiplier 55 has its input connected to the output of the $\omega$-selecting pulse rate multiplier 51. The multiplicand of the multiplier 55 is controlled by an accumulator 56 having an initial setting determined by the $\alpha$ storage unit 5. For tracing arcs of circles, the setting of accumulator 56 is reduced to zero. For that purpose it is connected to a zero reset mechanism 57 operated by a control unit 58 responsive to the R storage unit 13. The unit 58 also controls a multiple contact switch 58a, 58b, 58c, 58d which, in the position shown, interrupts the connections between secondary pulse rate multipliers 49 and 50 and the accumulators 45 and 46. When those connections are interrupted, the apparatus is set to trace straight line segments. (Instead of opening the switches 58a–58d, the control unit 58 may accomplish the same result by setting the $\alpha$ and $\omega$ accumulators 56 and 52 to 0.) When those connections are completed, and accumulator 52 is set at a value other than zero, then the apparatus may trace either constant radius, i.e., arcuate segments, by setting the accumulator 56 at zero, or may trace variable radius (Sici spiral) segments, by setting the accumulators 56 at a value other than zero.

The outputs of the primary pulse rate multipliers 40 and 41 are fed to a D$x$ or D$y$ accumulator 61 and a D$y$ or D$x$ accumulator 62. The initial settings of the accumulators 61 and 62 are respectively determined by the D$x$ or D$y$ storage unit 8 and the D$y$ or D$x$ storage unit 9. The accumulators 61 and 62 are driven toward zero from their initial settings by the pulse inputs from multipliers 40 and 41. When they reach zero, they actuate power stop controls 63 and 64, which stop the motion of the motors 32 and 36. The power stop controls 63 and 64 may act respectively on either of the motors 32 and 36, depending on the positions of the switches 44a and 44d of control unit 44. When the switches 44a and 44d are in the positions shown, the power stop control 63 stops the X-motor 36, and the power stop control 64 stops the Y-motor 32. When the switches 44a and 44d are moved to the right from the positions shown, to their other circuit-controlling position, then control 63 stops the Y-motor 32 and control 64 stops the X-motor 36. The stopping of the motors indicates that the tracing of a line segment has been completed. The power stop controls 63 and 64 send signals to the sequence control 3, which stops the pulse generator 37 and then causes the various storage units 4 to 15 to deliver a new set of data into the various accumulators. As soon as the storage units transfer their data to the accumulators, the sequence control 3 starts the pulse generator again to initiate operation of the motors 32 and 36 to trace a new segment.

Those elements appearing in FIG. 6 to the left of the vertical dot-dash line may be considered as prior art apparatus. The new elements added in accordance with the present invention appear to the right of the dot-dash line.

*Operation*

The pulse rate at the output of the primary pulse rate multiplier 40 determines the rate of movement of torch 29 in the X direction, while the pulse rate at the output of multiplier 41 determines the rate of movement of torch 29 in the Y direction (providing the contacts of control unit 44 are in the positions shown in the drawing).

The pulse generator 37 produces pulses at an arbitrarily selected rate, which, to simplify the mathematics to follow, is designated as unity. The multiplier 38 multiplies that rate by a factor $\sqrt{}$, which determines the maximum rate of movement of torch 29 over the workpiece 30. For the purposes of the following analysis, the output pulse rate $v$ from the multiplier 38 may be regarded as a constant. As mentioned above, the pulse rate and the factor $v$ are so chosen with respect to the characteristics of the motors 32 and 36, and the gearing between those motors and their loads, so that each pulse may be regarded as equivalent to an infinitesimal distance of travel of the torch 29.

If the initial settings of the accumulators 45 and 46 are, respectively, the cosine and sine of the angle $\theta_0$ between the X axis and the tangent to the line to be traced, at its point of beginning, then the torch will start moving from that point in the direction of that tangent. Variations in the direction of motion will be determined by the values introduced into the accumulators 45 and 46 by the secondary multipliers 49 and 50.

Consider now that combination of elements which includes the secondary pulse rate multipliers 49 and 50 and the accumulators 45 and 46. Let the pulse rate at the inputs of the multipliers 49 and 50 be identified as $\omega$.

Each pulse at the inputs of multipliers 49 and 50 has an effect at the X- and Y-motors 36 and 32 so small that it may, without substantial error, be considered an infinitesimal, to be represented by $d\theta$, since it represents a change in the angle between the tangent to the curve and the X axis. The summation of those pulses by the accumulators 45 and 46 may be considered integrations of that infinitesimal.

The accumulator 45 is arranged to count up in response to the pulses supplied from multiplier 49, while the accumulator 46 counts down in response to pulses from multiplier 50. In tracing any curve segment, one of the two functions, sin $\theta$ and cos $\theta$ (which together define the slope of the tangent to the curve), will increase as the torch 29 moves along the curve, while the other will decrease. The function which is to increase must be programmed into the count-up accumulator 45, while the function which is to decrease must be programmed into the count-down accumulator 46.

To analyze the operation of multipliers 49 and 50, and accumulators 45 and 46, assume that the count-up accumulator 45 is initially set at zero, while the count-down accumulator 46 is initially set at 1.000.

Let $m$ represent the number of pulses supplied to the count-up accumulator 45 and let $n'$ represent the number of pulses supplied to the count-down accumulator 46. Let $n=1-n'=$ the reading of the accumulator 46.

Referring to multiplier 50, we may say, $$\int m d\theta = n' \qquad (2)$$

Referring to multiplier 49, we may say, $$\int n d\theta = m \qquad (3)$$

Since $n=(1-n')$, Equation 3 may be written $$\int (1-n') d\theta = m \qquad (4)$$

Differentiating Equations 2 and 4, we get, respectively, $$m = \frac{dn'}{d\theta} \tag{5}$$

$$1 + n' = \frac{dm}{d\theta} \tag{6}$$

Differentiating Equations 5 and 6 we get, respectively, $$\frac{dm}{d\theta} = \frac{d^2n'}{d\theta^2} \tag{7}$$

$$\frac{-dn'}{d\theta} = \frac{d^2m}{d\theta^2} \tag{8}$$

Substituting (5) in (8) and rearranging, we get, $$\frac{d^2m}{d\theta^2} + m = 0 \tag{9}$$

Substituting (6) in (7) and rearranging, we get, $$\frac{d^2n'}{d\theta^2} - (1-n') = 0 \tag{10}$$

And since $n = 1-n'$, $$\frac{d^2n}{d\theta^2} + n = 0 \tag{11}$$

The solution of differential Equations 9 and 11 is $$m \text{ or } n = A_1 \sin \theta + B_1 \cos \theta \tag{12}$$

By definition, when $d\theta = 0$, $m = 0$ and $n = 1$.
And, substituting these values in Equations 5 and 6

$$\frac{dm}{d\theta} = 1 \tag{13}$$

$$\frac{dn}{d\theta} = 0 \tag{14}$$

Differentiating (12), we get $$\frac{dn}{d\theta} = \frac{dm}{d\theta} = A_1 \cos \theta - B_1 \sin \theta$$

Solving for the coefficients $A_1$ and $B_1$ conventionally, we get $$m = \sin \theta \tag{15}$$

$$n = \cos \theta \tag{16}$$

It may be stated, therefore, that the pulse rate multipliers 49 and 50 and the accumulators 45 and 46 cooperate to provide a sine and cosine generator.

In the angular velocity multiplier 51, the input pulse rate (unity) is multiplied by a variable multiplicand $\omega$ determined by the sum of the initial setting $\omega_0$ of accumulator 52 plus (or minus) the integrated output of multiplier 55. Multiplier 55 has a fixed multiplicand $\alpha$ and its input pulse rate is the same as the output pulse rate of multiplier 51. The output pulse rate of multiplier 51 is then $\omega$, and may be expressed by the following equation:

$$\omega = \omega_0 + \alpha \int_0^t \omega \, dt \tag{17}$$

Differentiating Equation 17, we get:

$$d\omega = \alpha \omega \, dt \tag{18}$$

Equation 18 may be written:

$$\frac{d\omega}{\omega} = \alpha \, dt \tag{19}$$

Integrating Equation 19, we get:

$$\int \frac{d\omega}{\omega} = \int \alpha \, dt + c \tag{20}$$

$$\ln \omega = \alpha t + c \tag{21}$$

$$\epsilon^{\ln \omega} = \epsilon^{\alpha t + c} \tag{22}$$

$$\omega = \epsilon^{\alpha t} \epsilon^c \tag{23}$$

When $t = 0$, $$\omega = \omega_0 = \epsilon^c \tag{24}$$

Therefore, $$\omega = \omega_0 \epsilon^{\alpha t} \tag{25}$$

The pulse rate $\omega$ determines the rate at which the angle $\theta$ changes, and so multiplier 51 may be referred to as the angular velocity multiplier, and $\omega$ as the angular velocity.

$\alpha$ is an acceleration exponential factor and does not represent angular acceleration $$\left(\frac{d\omega}{dt}\right)$$

as that variable is commonly defined. $\alpha$ may be regarded as the reciprocal of the time constant associated with the exponential multiplier of $\omega_0$ in Equation 25.

$\theta$, the angle between the X axis and the tangent to the curve being traced, may be defined as follows:

$$\theta = \theta_0 + \int_0^t \omega \, dt \tag{26}$$

Substituting (25), we get, $$\theta = \theta_0 + \omega_0 \int_0^t \epsilon^{\alpha t} dt \tag{27}$$

$$\theta = \theta_0 - \frac{\omega_0}{\alpha}(1 - \epsilon^{\alpha t}) \tag{28}$$

The pulse rate $x$ at the output of multiplier 40 determines the rate of movement in the X direction due to energization of the X motor 36 and may be expressed as:

$$x = v \int_0^t \cos \theta \, dt \tag{29}$$

Correspondingly, the pulse rate $y$ at the output of multiplier 41 determines the rate of movement in the Y direction due to energization of the Y motor 32, and may be expressed as:

$$y = v \int_0^t \sin \theta \, dt \tag{30}$$

Substituting (28) in (29), we get:

$$x = v \int_0^t \cos \left\{ \theta_0 - \frac{\omega_0}{\alpha}(1 - \epsilon^{\alpha - t}) \right\} dt \tag{31}$$

$$x = \frac{v}{\alpha} \int_0^t \frac{\cos \left\{ \frac{\omega_0}{\alpha} \epsilon^{\alpha t} + \left(\theta_0 - \frac{\omega_0}{\alpha}\right)\right\} \omega_0 \epsilon^{\alpha t} dt}{\frac{\omega_0}{\alpha} \epsilon^{\alpha t}} \tag{32}$$

Let $$Z = \frac{\omega_0}{\alpha} \epsilon^{\alpha t} \tag{33}$$

and $$k = \theta_0 - \frac{\omega_0}{\alpha} \tag{34}$$

Substituting (33) and (34) in (32)

$$x = \frac{v}{\alpha} \int_{\frac{\omega_0}{\alpha}}^{\frac{\omega_0}{\alpha}\epsilon^{\alpha t}} \frac{\cos (Z+k)}{Z} dZ \tag{35}$$

In changing the variable from $t$ to $Z$, the limits must be changed to the values of the variable $Z$ when $t$ is equal to 0 and $t$ respectively. When $t$ is 0, then according to Equation 33

$$Z = \frac{\omega_0}{\alpha}$$

This limiting value of Z is identical with the limiting value for $U(\theta_0)$ as used in Equations 1d and 1e above. Consequently, $$\theta_0 = \frac{\omega_0}{\alpha}$$

or $\omega_0 = \alpha \theta_0$.

$$x = \frac{v}{\alpha}\left\{\cos k \int_{\frac{\omega_0}{\alpha}}^{\frac{\omega_0}{\alpha}\epsilon^{\alpha t}} \frac{\cos Z \, dZ}{Z} - \sin k \int_{\frac{\omega_0}{\alpha}}^{\frac{\omega_0}{\alpha}\epsilon^{\alpha t}} \frac{\sin Z}{Z} dZ\right\} \quad (36)$$

Similarly, $$y = \frac{v}{\alpha}\left\{\sin k \int_{\frac{\omega_0}{\alpha}}^{\frac{\omega_0}{\alpha}\epsilon^{\alpha t}} \frac{\cos Z \, dZ}{Z} + \cos k \int_{\frac{\omega_0}{\alpha}}^{\frac{\omega_0}{\alpha}\epsilon^{\alpha t}} \frac{\sin Z}{Z} dZ\right\} \quad (37)$$

The function represented by Equations 36 and 37 may be rotated through an angle $k$ (see Equation 34) by the use of the following equations:

$$x' = x \cos k + y \sin k \quad (38)$$
$$y' = -x \sin k + y \cos k \quad (39)$$

Substituting Equations 36 and 37 in Equations 38 and 39, we get:

$$x' = \frac{v}{\alpha} \int_{\frac{\omega_0}{\alpha}}^{\frac{\omega_0}{\alpha}\epsilon^{\alpha t}} \frac{\cos Z \, dZ}{Z} \quad (40)$$

$$y' = \frac{v}{\alpha} \int_{\frac{\omega_0}{\alpha}}^{\frac{\omega_0}{\alpha}\epsilon^{\alpha t}} \frac{\sin Z}{Z} dZ \quad (41)$$

It will be recognized that these equations represent a particular form of Sici spiral, which, as stated above, is a geometrical figure defined mathematically by the following equations:

$$x = \int_U^\infty \frac{\cos Z}{Z} dZ \quad (42)$$

$$y = \int_U^\infty \frac{\sin Z}{Z} dZ \quad (43)$$

The foregoing mathematical proof shows that for any settings of the $\omega$ accumulator 52 and the $\alpha$ accumulator 56, other than 0, the apparatus of FIG. 6 will cause the cutting torch 29 to trace a curve with respect to the plate 30 which is a section of a Sici spiral. In order to select particular Sici spirals to be traced by the apparatus, particular settings of the $\alpha$ and $\omega$ accumulators must be derived from the curve to be traced.

The setting of $\alpha$ accumulator 56 is determined from the equation:

$$\alpha = \frac{v}{D} d \quad (44)$$

where $D$ is the straight line distance between the ends of the curve and $v$ and $d$ have the values indicated above.

Equation 44 may be derived by considering the curve as a Sici spiral and using the theorem of Pythagoras to get the equation (as in the case of Equation 1e)

$$D = \sqrt{(x')^2 + (y')^2} \quad (45)$$

and then substituting the values of $x'$ and $y'$ derived from Equations 40 and 41, so that Equation 45 becomes $$D = \frac{v}{\alpha}\sqrt{\left\{\text{Ci}\left(\frac{\omega_0}{\alpha}\right) - \text{Ci}\left(\frac{\omega_0}{\alpha}\epsilon^{\alpha t}\right)\right\}^2 + \left\{\text{Si}\left(\frac{\omega_0}{\alpha}\right) - \text{Si}\left(\frac{\omega_0}{\alpha}\epsilon^{\alpha t}\right)\right\}^2} \quad (46)$$

The radical quantity on the right-hand side of the above equation is equal to $d$ as shown in the table of FIG. 5 and as derived in accordance with Equation 1e. Substituting $d$ for the radical and solving for $\alpha$, we get:

$$\alpha = \frac{v}{D} d \quad (47)$$

which is identical with Equation 44.

Having determined $\alpha$, we now determine $\omega_0$ from the equation:

$$\omega_0 = \alpha \theta_0 \quad (48)$$

In FIG. 4, the solution of Equation 47 is carried out by multiplier 18, and the solution of Equation 48 is carried out by multiplier 19.

When the accumulator 56 is set to zero, the value for $\omega$ becomes equal to $\omega_0$ and is a constant. The angle $\theta$ correspondingly varies at a constant rate and the Equations 29 and 30 then define an arc of a circle. To change the radius of the circle, the input to accumulator 39 is varied inversely with the radius. In other words, instead of programming a fixed $v$ into accumulator 39, $v/r$ is programmed.

When the controller 58 is operated to interrupt the connections between the pulse rate multipliers 49 and 50 and the accumulators 45 and 46 (or alternatively when accumulator 52 is set to zero), than the pulse rates at the outputs of the multipliers 40 and 41 are constant. Consequently, the direction of movement of the cutting torch 29 with respect to the workpiece 30 remains fixed, and the apparatus traces a straight line.

It is assumed in the foregoing explanation, as mentioned above: (1) that the contacts of control 44 are in the positions shown, so that multiplier 40 controls X-motor 36 and multiplier 41 controls Y-motor 32; (2) that accumulator 45 counts up, while accumulator 46 counts down; (3) that sin $\theta_0$ is initially set into accumulator 45 and cos $\theta_0$ into accumulator 46; and (4) that the segment to be traced is one in which the sine increases and the cosine decreases.

If, on the contrary, the segment being traced is one in which the sine decreases and the cosine increases, then the contacts of control 44 are shifted in response to the $\pm \Delta \sin \theta$ input, to their other positions, wherein the multiplier 41 controls X-motor 36 and multiplier 40 controls Y-motor 32. At the same time, control unit 26 (FIG. 3), which also responds to the $\pm \Delta \sin \theta$ input, shifts its contacts so that sin $\theta$ is set into accumulator 46 and cos $\theta_0$ is set into accumulator 45. At the same time, control unit 26 puts D$y$ into storage unit 8 and D$x$ into storage unit 9, to correspond to the new line-up of the motors.

Similar results may be secured without the use of control 44, by making motors 47 and 48 reversible, and selecting their respective directions of operation in accordance with the characteristics of the line segment to be traced. In that arrangement, each of the multipliers 40 and 41 always controls the same one of the X- and Y-motors 32 and 36.

It may be seen that the apparatus described may be programmed to trace either straight line segments, arcuate segments or variable radius (Sici spiral) segments. The programming of the apparatus to describe segments of each of these types has been illustrated in connection with FIGS. 2 and 3 above.

While I have shown and described a preferred embodiment of my invention, other modifications thereof will readily occur to those skilled in the art and I therefore intend my invention to be limited only by the appended claims.

I claim:

1. Apparatus for controlling two relatively movable members to produce relative movement thereof along a path having a variable radius portion, comprising:
   (a) two pulse responsive motors, each operatively connected to the members for producing relative movement thereof in the direction of one of two coordinate axes;
   (b) a source of electrical pulses;
   (c) two pulse rate multipliers;
   (d) each of said pulse rate multipliers
       (1) including an input and an output, and (2) being effective to produce at the output a train of pulses having an average pulse rate equal to the input average pulse rate times a multiplicand;
(e) first accumulator means for determining a multiplicand for one primary multiplier;
(f) second accumulator means for determining a multiplicand for the other primary multiplier;
(g) each accumulator means including:
(1) means for setting an initial multiplicand, and
(2) pulse rate responsive means for varying the multiplicand;
(h) means connecting the inputs of both multipliers to the source;
(i) means connecting the outputs of the two multipliers to the respective motors;
(j) pulse rate sine-cosine generator means for producing two trains of output pulses having average rates respectively varying as the sine and cosine of an angle;
(k) means for supplying the two trains of output pulses of the sine-cosine generator means to the respective pulse rate responsive means for varying the multiplicands of the first and second accumulator means; and
(l) means for varying continuously the angle whose sine and cosine are generated by said generator means.

2. Apparatus for controlling two relatively movable members to produce relative movement thereof along a path having a variable radius portion, comprising:
(a) two pulse responsive motors, each operatively connected to the members for producing relative movement thereof in the direction of one of two coordinate axes;
(b) a source of electrical pulses;
(c) two primary pulse rate multipliers;
(d) two secondary pulse rate multipliers;
(e) each of said pulse rate multipliers
(1) including an input and an output, and
(2) being effective to produce at the output a train of pulses having an average pulse rate equal to the input average pulse rate times a multiplicand;
(f) first accumulator means for determining a multiplicand for one primary multiplier and one secondary multiplier;
(g) second accumulator means for determining a multiplicand for the other primary multiplier and the other secondary multiplier;
(h) each accumulator means including:
(1) means for setting an initial multiplicand, and
(2) pulse responsive means for varying the multiplicand;
(i) means connecting the inputs of both primary multipliers to the source;
(j) means connecting the outputs of the two primary multipliers to the respective motors;
(k) means connecting the output of said one secondary multiplier to the pulse responsive means for varying the multiplicand of said second accumulator means;
(l) means connecting the output of said other secondary multiplier to the pulse responsive means for varying the multiplicand of said first accumulator means; and
(m) means for supplying a train of pulses at a variable average rate to the inputs of both the secondary multipliers.

3. Apparatus as defined in claim 2, including means operable to stop operation of both said multiplicand varying means, said apparatus being effective when operation of both the multiplicand carrying means is stopped to produce relative movement of the movable members along a straight portion of said path.

4. Apparatus as defined in claim 2, in which said means for supplying a train of pulses to the secondary multipliers comprises an angular velocity pulse rate multiplier including an input and an output, and effective to produce at the output a train of pulses having an average pulse rate equal to the input average pulse rate times a multiplicand, and third accumulator means for determining the multiplicand of the angular velocity multiplier.

5. Apparatus as defined in claim 4, in which said third accumulator means includes:
(1) means for setting an initial multiplicand; and
(2) means for varying the multiplicand; said multiplicand varying means being settable to zero variation, said means for supplying a train of pulses being effective when the multiplicand varying means is set for zero variation to supply a train of pulses at a fixed rate to the secondary multipliers, said apparatus being then effective to produce relative movement of the movable members along an arcuate portion of said path.

6. Apparatus for controlling two relatively movable members to produce relative movement thereof along a path having a variable radius portion, comprising:
(a) two pulse responsive motors, each operatively connected to the members for producing relative movement thereof in the direction of one of two coordinate axes;
(b) a source of electrical pulses;
(c) two primary pulse rate multipliers;
(d) two secondary pulse rate multipliers;
(e) an angular velocity pulse rate multiplier;
(f) an angular acceleration pulse rate multiplier;
(g) each of said pulse rate multipliers
(1) including an input and an output, and
(2) being effective to produce at the output a train of pulses having an average pulse rate equal to the input average pulse rate times a multiplicand;
(h) first accumulator means for determining a multiplicand for one primary multiplier and one secondary multiplier;
(i) second accumulator means for determining a multiplicand for the other primary multiplier and the other secondary multiplier;
(j) each accumulator means including:
(1) means for setting an initial multiplicand, and
(2) pulse responsive means for varying the multiplicand;
(k) means connecting the inputs of both primary multipliers to the source;
(l) means connecting the outputs of the two primary multipliers to the respective motors;
(m) means connecting the output of said one secondary multiplier to the pulse responsive means for varying the multiplicand of said second accumulator means;
(n) means connecting the output of said other secondary multiplier to the pulse responsive means for varying the multiplicand of said first accumulator means;
(o) means connecting the output of the angular velocity multiplier to the inputs of both the secondary multipliers;
(p) third accumulator means for determining the multiplicand of the angular velocity multiplier, including:
(1) means for setting an initial multiplicand; and
(2) pulse responsive means for varying the multiplicand;
(q) means connecting the input of the angular velocity multiplier to said source;
(r) means connecting the input of the angular acceleration multiplier to the output of the angular velocity multiplier;
(s) means connecting the output of the angular acceleration multiplier to the input of the pulse responsive means for varying the multiplicand of the angular velocity multiplier; and (t) fourth accumulator means for determining the multiplicand of the angular acceleration multiplier.

References Cited by the Examiner

UNITED STATES PATENTS

| | | |
|---|---|---|
| 2,717,979 | 9/55 | Gardiner. |
| 2,843,811 | 7/58 | Tripp _____ 318—39 X |
| 2,851,643 | 9/58 | Limberger. |
| 3,007,096 | 10/61 | Tripp _____ 318—39 X |
| 3,035,216 | 5/62 | Rhoades et al. _____ 318—39 X |
| 3,062,995 | 11/62 | Raymond et al. _____ 318—39 X |
| 3,093,781 | 6/63 | Anke et al. _____ 318—162 |
| 3,099,777 | 7/63 | Davis _____ 318—162 X |
| 3,099,781 | 7/63 | Herchenroeder _____ 318—162 |

FOREIGN PATENTS 807,643  1/59  Great Britain.

ORIS L. RADER, *Primary Examiner.*

UNITED STATES PATENT OFFICE
CERTIFICATE OF CORRECTION

Patent No. 3,191,111                                       June 22, 1965

William J. Greene

It is hereby certified that error appears in the above numbered patent requiring correction and that the said Letters Patent should read as corrected below.

Column 7, line 34, for "betwen" read -- between --; lines 56 to 59, for that portion of the equation reading "$=\theta_1$" read -- $-\theta_1$ --; column 11, equation "(6)", should appear as shown below instead of as in the patent:

$$1 - n' = \frac{dm}{d\theta}$$

equation "(22)" should appear as shown below instead of as in the patent:

$$\varepsilon^{\ln \omega} = \varepsilon^{\alpha t + c}$$

same column 11, equation "(24)" should appear as shown below instead of as in the patent:

$$\omega = \omega_0 = e^c$$

column 12, equation "(31)" for that portion of the equation reading $$(1 - \varepsilon^{\alpha - t}) \quad\quad \text{read} \quad\quad (1 - \varepsilon^{\alpha t})$$

column 15, line 73, for "carrying" read -- varying --.

Signed and sealed this 3rd day of May 1966.

(SEAL)
Attest:

ERNEST W. SWIDER                                   EDWARD J. BRENNER
Attesting Officer                                   Commissioner of Patents